United States Patent [19]

Ray

[11] 4,089,695

[45] May 16, 1978

[54] HYDRAULIC CEMENT MIXES AND PROCESS FOR IMPROVING HYDRAULIC CEMENT MIXES

[75] Inventor: James A. Ray, Mantua, Ohio

[73] Assignee: Martin Marietta Corporation, Bethesda, Md.

[21] Appl. No.: 715,189

[22] Filed: Aug. 17, 1976

[51] Int. Cl.² ............................................. C04B 7/02
[52] U.S. Cl. ...................................... 106/89; 106/97; 106/315
[58] Field of Search ............................ 106/89, 97, 315

[56] References Cited

U.S. PATENT DOCUMENTS 3,188,221  6/1965  Matsuda et al. .................... 106/315

Primary Examiner—Winston A. Douglas
Assistant Examiner—John P. Sheehan
Attorney, Agent, or Firm—Gay Chin; George W. Moxon, II; Ronald G. Ort

[57] ABSTRACT

A hydraulic cement mix including a Portland type cement, aggregate, sufficient water to effect hydraulic setting of the cement, and an additive comprising an alkali or alkaline earth fluotitanate, wherein the additive is present in an amount sufficient to retard beneficially the setting and hardening of the mix. The additive is preferably selected from the group comprising calcium, potassium and sodium fluotitanate and is present in an amount of between about 0.005% by weight and 1.0% by weight based upon the weight of the cement.

12 Claims, No Drawings

HYDRAULIC CEMENT MIXES AND PROCESS FOR IMPROVING HYDRAULIC CEMENT MIXES

BACKGROUND OF THE INVENTION

This invention relates to additive compositions, also known as admixtures, for incorporation in hydraulic cement mixes, for example, Portland type cement concretes and mortars and dry mixes for making such concretes and mortars.

Many admixtures which act as set retarders are employed primarily to achieve water reduction and improved compressive strength. As retarders, such admixtures slow the chemical process of hydration so that the concrete remains plastic and workable for a longer time than concrete without such a retarder. For example, a retarding admixture would be used to delay the set of the cement during difficult placements that require the concrete to be in a plastic condition for a longer than normal period of time to overcome undesired acceleration of set during hot weather.

Among the materials commonly used as set retarders, but which also are used for water reduction and improved compressive strength, are the lignosulfonates, such as calcium lignosulfonate; salts of hydroxycarboxylic acids; sugars such as glucose (dextrose), maltose and the like; and highly polymerized polysaccharides, such as dextrins. Additionally, starch, cellulose, phosphoric acid, and silicofluorides are used as retarding agents for retarding the setting time of cement mixes.

Retarding admixtures are frequently not used by themselves because either the dosage range is not practical and/or economical or, when there is the slightest variation in the amount, the mixing procedure or temperature, the admixture effects a greater degree of retardation of the rate of set or hardening, and sometimes of early strength, of the concrete or mortar than is desired. For example, when the lignosulfonates are employed in a practical and economical dosage range, they may effect a greater degree of retardation that is desired, or greater air entrainment than is desired, in addition to reducing the amount of water needed and increasing the compressive strength. To overcome these undesirable effects, frequently the retarder is employed with other admixtures such as calcium chloride or triethanolamine which are well known accelerators, to balance out the excess retardation. Further, the retarders may be used in combinations so that the smaller dosages of the individual ingredients will mean that the adverse effects will be lessened. For example in U.S. Pat. No. 3,188,221, silicofluorides were combined with an acid, such as phosphoric acid, boric acid, acetic acid, succinic acid or mixtures thereof. In U.S. Pat. No. 3,317,327, a silicofluoride was combined with an organic surface active agent.

Thus, a need exists for an admixture which will be useful by itself to retard the rate of hardening of cement and/or concrete mixes without significantly reducing the amount of water required or significantly increasing the amount of air entrained in the mix or resulting in the creation of other problems by its mere usage.

SUMMARY OF THE INVENTION

The present invention is to an additive composition or admixture, for incorporation in Portland type cement mixes, such as concretes and mortars, and dry mixes for making concrete and mortars, and thus the improved Portland cement mixes incorporating the admixture.

For the purposes of this invention, the term "Portland type cement" is intended to mean and to include all cementitious compositions which have a high content of tricalcium silicate and thus are Portland cement or are chemically similar or analogous to Portland cement, the specification for which is set forth in ASTM C150-74. This would include cements in which fly ash, such as from steam or power generating stations, pozzolana, slag from blast furnaces, or mixtures of these are incorporated, and which result in a Portland type cement.

Broadly, the invention comprises a cement mix including Portland type cement, aggregate, sufficient water to effect hydraulic setting of the cement, and an additive or admixture comprising fluotitanate, such as an alkali or alkaline earth salt of fluotitanic acid, the additive being present in an amount sufficient to retard advantageously the rate of hardening of the cement mix. The additive is preferably selected from the group comprising calcium fluotitanate, potassium fluotitanate, and sodium fluotitanate and is present in an amount of between about 0.005 and 1.0% by weight based upon the weight of the cement mix, although an amount in the range of between about 0.01 and about 0.5% by weight is preferred Use of the additive is beneficial in that it will retard the rate of hardening of hydraulic cement mixes without appreciably reducing the required water or increasing the amount of air entrained.

It is therefore an object of the present invention to provide an improved hydraulic cement mix.

It is another object to provide a Portland cement mix which includes a retarding admixture which will retard advantageously the setting and hardening of the Portland cement mix without appreciably decreasing the water required or increasing the amount of air entrained in the cement mix.

It is a further object to provide a process for advantageously retarding the rate of hardening of cement mixes without appreciably decreasing the water required or increasing the amount of air entrained.

These and other objects and advantages of the invention will become apparent upon consideration of the description and discussion which follow.

DETAILED DESCRIPTION OF THE INVENTION

The salts of fluotitanic acid, such as the alkali and alkaline earth fluotitanates, are represented by the following general formula:

where
M represents an alkali metal, such as sodium or potassium, or an alkaline earth metal, such as magnesium or calcium and
$x$ is 2 or 1 depending upon whether M is an alkali metal or an alkaline earth metal.

Calcium, potassium and sodium fluotitanates, which are also referred to as titanium calcium fluoride or calcium titanium fluoride, etc., are white or colorless powders which are soluble to slightly soluble in water. Potassium fluotitanate is a generally commercially available product and has known utility as a source of titanic acid or titanium metal. Calcium and sodium fluotitanate are chemical specialty items but are commercially available.

In the practice of the present invention, an alkali or alkaline earth fluotitanate is incorporated in hydraulic cement mixes, such as Portland cement or Portland type cement concretes, mortars, and grouts, and dry mixes for making such concretes, mortars, and grouts, in amounts sufficient to retard advantageously the rate of hardening of the mix. That is, the rate of set is retarded without appreciably reducing the water requirement or increasing the amount of air entrained. Broadly, the fluotitanate will be incorporated in the cement mix in an amount within the range of from about 0.005% by weight to about 1.0% by weight based upon the weight of the cement mix. Preferably, the amount will be in an amount within the range of from about 0.01% by weight to about 0.5% by weight based upon the weight of the cement mix.

The additive of the present invention is incorporated into hydraulic cement mixes preferably by adding it to a portion of the mix water used for mixing of the hydraulic cement and aggregate. But, the additive could be included as part of a dry cement mix or added in any other convenient manner.

The term aggregate is intended to include both fine aggregate, such as sand, and coarse aggregate, such as crushed stone or gravel, as is common in the art. In general for mortars, the aggregate may be sand or other fine aggregate meeting the requirements of ASTM standard C-33. In general for concretes, the aggregate may be sand or other fine aggregate plus crushed stone or gravel or other coarse aggregate in accordance with ASTM standard C-33. The precise size, purity, quality, and quantity, or ranges thereof, of the fine and coarse aggregates will vary depending upon the desired use and properties of the mortar or concrete. For most common uses, although not limited thereto, the size of the fine aggregate will be within the broad range of about +4 mesh to −100 mesh, while the size of the coarse aggregate will be within the broad range of 3 inches to 4 mesh. The coarse aggregate will usually be of mineral origin, such as gravel or crushed rock, but it may in some cases consist at least partially of graded metallic material such as iron chips, slag, or other manufactured aggregate.

Further in general for dry mortar mixes, the proportion of fine aggregate to cement will be in the range of about 25 to about 75% by weight based upon the weight of the cement mix, depending upon the nature of the aggregate and the desired properties of the mix. For dry concrete mixes, the fine and coarse aggregates will fall generally within the broad ranges of 20 to 80% by weight of the mix and 5 to 60% by weight of the mix, respectively, depending upon the desired properties and use of the mix.

For both the mortars and concretes, the amount of water employed generally should be enough to effect hydraulic setting of the cement present in the mix and to provide suitable workability. This may broadly range from about 20 to 60% by weight of the cement in the mix for the mortars and about 25 to 70% by weight of the cement in the mix for the concretes. The precise amounts of water will depend upon the end use of the cement mix, as well as the aggregate present in the mix.

For purposes of illustrating the advantageous results obtainable by the practice of the present invention, plain cement mixes were prepared and compared with such mixes in which fluotitanate salts have been incorporated in varying dosages. The same type and brand of cement was used in each mix, and the proportion and kind of aggregate employed were substantially the same. A sufficient amount of water was added to each mix to effect hydraulic setting of the cement mix and to produce cement mixes of essentially the same consistency. In addition and for the purpose of further illustrating the invention, comparisons were made with a calcium lignosulfonate, which is a well known prior art material added for the purpose of retarding the hardening of cement mixes, as well as reducing the amount of water required.

The results shown in Tables Nos. I, II and III, illustrate the use of calcium, potassium and sodium fluotitanate in Type I Portland cement mixes to form concretes. The amount of Portland cement in the mix was 5 sacks per cubic yard of concrete (a sack of cement weighs 94 pounds), the fine aggregate to coarse aggregate ratio employed was 0.49, and the concretes had slumps in the range of 3.0 to 4.0 inches.

Table I

| Mix No. | Additive | Dose; percent by weight of cement | Water;gal./ cu. yd. of cement product | Air;vol. percent of cement product | Rate of hardening relative to plain mix;[1] hours | Compressive strength of cement product; p.s.i. 7 days | 28 days |
|---|---|---|---|---|---|---|---|
| Cement No. 1 | | | | | | | |
| 1 | None | | 37.9 | 1.5 | 0. | 3255 | 4680 |
| 2 | Calcium Fluotitanate | 0.002 | 37.9 | 1.5 | 0. | 3125 | 4575 |
| 3 | " | 0.01 | 37.9 | 1.5 | +½ | 3140 | 4700 |
| 4 | " | 0.10 | 38.0 | 1.5 | +1¼ | 3260 | 4705 |
| 5 | " | 0.20 | 38.0 | 1.5 | +1½ | 3315 | 4745 |
| 6 | Sodium Fluotitanate | 0.002 | 37.9 | 1.5 | +¼ | 3100 | 4665 |
| 7 | " | 0.01 | 38.0 | 1.5 | +½ | 3205 | 4795 |
| 8 | " | 0.10 | 38.0 | 1.5 | +¾ | 3280 | 4650 |
| 9 | " | 0.20 | 38.0 | 1.5 | +1½ | 3320 | 4725 |
| 10 | Potassium Fluotitanate | 0.20 | 37.9 | 1.5 | +2¼ | 3210 | 4785 |
| 11 | none | | 36.7 | 1.4 | 0. | 3410 | 4965 |
| 12 | Calcium Fluotitanate | 0.25 | 36.7 | 1.4 | >+2* | 3650 | 5050 |
| 13 | Sodium Fluotitanate | 0.25 | 36.7 | 1.4 | >+2* | 3605 | 5035 |

[1]Acceleration of set is indicated by a minus (−) sign, while retardation of set is indicated by a plus (+) sign.
*The retardation of the Rate of Hardening was in excess of but not measured beyond two hours.

Table II

| Mix No. | Additive | Dose; percent by weight of cement | Water;gal./ cu. yd. of cement product | Air;vol. percent of cement product | Rate of hardening relative to plain mix;[1] hours | Compressive strength of cement product; p.s.i. 7 days | 28 days |
|---|---|---|---|---|---|---|---|
| Cement No. 2 | | | | | | | |
| 14 | None | | 36.7 | 2.1 | 0. | 2905 | 3805 |
| 15 | Potassium Fluotitanate | 0.005 | 36.6 | 2.2 | +¼ | 2915 | 3760 |
| 16 | " | 0.0075 | 36.6 | 2.2 | +½ | 3020 | 3880 |
| 17 | " | 0.01 | 36.6 | 2.3 | +¾ | 2920 | 3890 |
| 18 | " | 0.25 | 36.6 | 2.4 | +2¼ | 3050 | 3845 |
| 19 | " | 0.50 | 36.6 | 2.3 | +3¼ | 3030 | 3840 |
| 20 | " | 0.75 | 36.5 | 2.3 | +4¼ | 2800 | 3580 |
| 21 | " | 1.0 | 36.5 | 2.3 | +5¼ | 2715 | 3265 |
| 22 | Calcium Lignosulfonate | 0.25 | 33.6 | 4.4 | +2 | 3430 | 4410 |
| 23 | Calcium Lignosulfonate plus Potassium Fluotitanate | 0.30 Total (0.25+0.05) | 33.4 | 4.6 | +5¼ | 3400 | 4320 |
| Cement No. 2 | | | | | | | |
| 24 | None | | 36.2 | 2.1 | 0. | 2690 | 3665 |
| 25 | Calcium Fluotitanate | 0.005 | 36.4 | 2.2 | 0. | 2750 | 3685 |
| 26 | " | 0.0075 | 36.6 | 2.2 | 0. | 2705 | 3750 |
| 27 | " | 0.01 | 37.1 | 2.3 | 0. | 2765 | 3705 |
| 28 | " | 0.25 | 37.4 | 2.2 | +2 | 2855 | 3755 |
| 29 | " | 0.50 | 37.7 | 2.1 | +3½ | 2765 | 3620 |
| 30 | " | 0.75 | 38.3 | 2.1 | +4½ | 2585 | 3480 |
| 31 | " | 1.0 | 38.8 | 2.0 | +5½ | 2500 | 3380 |
| 32 | Calcium Lignosulfonate | 0.25 | 32.8 | 4.1 | +2 | 3305 | 4265 |
| 33 | Calcium Lignosulfonate plus Calcium Fluotitanate | 0.30 Total (0.25+0.05) | 32.2 | 4.5 | +5¼ | 3205 | 4260 |

[1]Acceleration of set is indicated by a minus (−) sign, while retardation of set is indicated by a plus (+) sign.

Table III

| Mix No. | Additive | Dose; percent by weight of cement | Water;gal./ cu. yd. of cement product | Air; vol. percent of cement product | Rate of hardening relative to plain mix;[1] hours | Compressive strength of cement product; p.s.i. 7 days | 28 days |
|---|---|---|---|---|---|---|---|
| Cement No. 3 | | | | | | | |
| 34 | None | | 37.4 | 1.9 | 0. | 2255 | 2960 |
| 35 | Potassium Fluotitanate | 0.005 | 37.2 | 1.9 | +¼ | 2190 | 2945 |
| 36 | " | 0.0075 | 37.2 | 1.9 | +½ | 2250 | 3105 |
| 37 | " | 0.01 | 37.2 | 2.0 | +¾ | 2345 | 3000 |
| 38 | " | 0.25 | 37.2 | 2.0 | +1¾ | 2580 | 3320 |
| 39 | " | 0.50 | 37.2 | 1.8 | +2¼ | 2655 | 3370 |
| 40 | " | 0.75 | 37.1 | 2.1 | +3¼ | 2570 | 3215 |
| 41 | " | 1.0 | 37.1 | 2.0 | +3¾ | 2590 | 3175 |
| 42 | Calcium Lignosulfonate | 0.25 | 33.7 | 4.1 | +1¾ | 2955 | 3715 |
| 43 | Calcium Lignosulfonate plus Potassium Fluotitanate | 0.30 Total (0.25+0.05) | 33.8 | 4.2 | +4¼ | 3000 | 3790 |
| Cement No. 3 | | | | | | | |
| 44 | None | | 36.6 | 1.8 | 0. | 2175 | 2915 |
| 45 | Calcium Fluotitanate | 0.005 | 36.6 | 1.9 | 0. | 2160 | 2860 |
| 46 | " | 0.0075 | 36.6 | 2.0 | 0. | 2240 | 3045 |
| 47 | " | 0.01 | 36.7 | 2.0 | +0. | 2215 | 3060 |
| 48 | " | 0.25 | 36.8 | 2.0 | +¾ | 2495 | 3275 |
| 49 | " | 0.50 | 37.0 | 1.9 | +1½ | 2400 | 3230 |
| 50 | " | 0.75 | 37.1 | 1.9 | +2 | 2435 | 3220 |
| 51 | " | 1.0 | 37.2 | 1.9 | +3¾ | 2395 | 3250 |
| 52 | Calcium Lignosulfonate | 0.25 | 33.1 | 4.4 | +1½ | 2795 | 3735 |
| 53 | Calcium Lignosulfonate plus Calcium Fluotitanate | 0.30 Total (0.25+0.05) | 33.5 | 4.2 | +3¾ | 3140 | 4000 |

[1]Acceleration of set is indicated by a minus (−) sign, while retardation of set is indicated by a plus (+) sign.

As can be seen in Table I, the fluotitanates, especially calcium, potassium and sodium, when used alone as the admixture, will retard the rate of hardening of Portland cement mixes without appreciably increasing the amount of air entrained, reducing the water required or affecting the resulting seven or twenty-eight days strengths, as compared to similar mixes without the additive. In fact, the addition of the fluotitanates resulted in slight increases in the compressive strengths for the cement mixes involved.

In Tables II and III, Type I Portland cements were also used, but from different manufacturers, and these data confirm the results shown in Table I, as well as demonstrate the use of a greater range of amounts of the fluotitanates. Again, the rate of hardening of the cement mixes could be retarded without appreciably affecting the amount of air entrained, the water required or compressive strengths achieved. In fact, the compressive strengths generally increased, except in mixes Nos. 30 and 31, where the decrease in strength was attributable to the fact that too much water was employed (i.e., 38.3 and 38.8 gal./cu.yd. of cement as compared to 36.2 gal./cu.yd. of cement for the plain cement mix).

In comparison to the use of a calcium lignosulfonate admixture, fluotitanates resulted in about the same decrease in the rate of hardening, but the lignosulfonate admixture resulted in higher air entrainment and a lower water requirement, while producing a greater increase in the compresive strengths.

It is within the scope of the invention, to incorporate in the cement mixes, prepared as herein provided, other additives known in the art for the express purpose for which they are normally employed. Such other additives may, for example, be air-entraining agents, air-detraining agents, pozzolanic materials, fly-ash, coloring agents, water repellents, set accelerators, and the like. Fluotitanate salts may also be employed in conjunction with a combination of such cement additives to produce desired changes in the physical properties of the concrete being produced.

It is also within the scope of the invention to employ the fluotitanates together with known set retarders, such as lignosulfonates, sugars, glucosaccharides, and the like, or combination thereof, and in fact as shown in Tables II and III, the combination of a fluotitanate with calcium lignosulfonate resulted in a greater retardation than either achieved individually.

While the invention has been described with reference to certain preferred embodiments thereof, those skilled in the art will appreciate that various changes and modifications and substitutions can be made without departing from the spirit of the invention. It is intended, therefore, that the invention will be limited only by the scope of the claims which follow.

What I claim is:

1. A hydraulic cement mix including Portland type cement, aggregate, sufficient water to effect hydraulic setting of the cement, and an additive comprising an alkali or alkaline earth fluotitanate, said additive being present in an amount sufficient to retard the rate of hardening of said cement mix.

2. A hydraulic cement mix as claimed in claim 1 wherein said additive is present in an amount of between about 0.005% by weight and 1.0% by weight based upon the weight of the cement.

3. A hydraulic cement mix as claimed in claim 1 wherein said additive is present in an amount of between about 0.01 by weight of 0.5% by weight based upon the weight of the cement.

4. A hydraulic cement mix as claimed in claim 1 wherein said additive is selected from the group consisting of calcium fluotitanate, potassium fluotitanate and sodium fluotitanate.

5. A hydraulic cement mix as claimed in claim 1 wherein said aggregate comprises sand and said cement mix comprises a mortar mix.

6. A hydraulic cement mix as claimed in claim 1 wherein said aggregate comprises sand and crushed stone or gravel and said cement mix comprises a concrete mix.

7. A process for advantageously retarding the rate of hardening of Portland type cement mixes comprising incorporating in a hydraulic cement mix, including a hydraulic cement, aggregate and sufficient water to effect hydraulic setting of said cement, an additive comprising an alkali or alkaline earth fluotitanate and being present in an amount sufficient to retard the rate of hardening of said cement mix.

8. A process as claimed in claim 7 wherein said additive is present in an amount of between about 0.005% by weight to about 1.0% by weight based upon the weight of the cement.

9. A process as claimed in claim 7 wherein said additive is present in an amount of between about 0.01% by weight and 0.5% by weight based upon the weight of the cement.

10. A process as claimed in claim 7 wherein said additive is selected from the group consisting of calcium fluotitanate, potassium fluotitanate and sodium fluotitanate.

11. A process as claimed in claim 7 wherein said aggregate comprises sand and said cement mix comprises a mortar mix.

12. A process as claimed in claim 7 wherein said aggregate comprises sand and crushed stone or gravel and said cement mix comprises a concrete mix.

* * * * *

UNITED STATES PATENT AND TRADEMARK OFFICE
CERTIFICATE OF CORRECTION

PATENT NO. : 4,089,695
DATED : May 16, 1978
INVENTOR(S) : James A. Ray

It is certified that error appears in the above-identified patent and that said Letters Patent are hereby corrected as shown below:

Column 2, Line 51, --$M_xTiF_6$-- should be inserted.

Columns 5 and 6, Table II, Mix No. 24, Under "Dose" (column 3), "36.2" should be --        --;

Under "Water" (column 4), "2.1" should be --36.2--;

Under "Air" (column 5), "0." should be --2.1--;

Under "Rate of hardening" (column 6), "2690" should be --0--;

Under "Compressive strength - 7 days" (column 7, sub-column 1), "3665" should be --2690--; and Under "Compressive strength - 28 days" (column 7, sub-column 2), "       " should be --3665--.

Column 7, Line 37, "0.01" should be --0.01%--; and "of" should be --and--.

Signed and Sealed this

*Thirty-first* Day of *October 1978*

[SEAL]

Attest:

RUTH C. MASON
*Attesting Officer*

DONALD W. BANNER
*Commissioner of Patents and Trademarks*